April 4, 1933.  C. C. COLBERT ET AL  1,903,325
PAPER COATING METHOD AND APPARATUS
Filed Jan. 21, 1929  5 Sheets-Sheet 1

Inventors
Charles C. Colbert
George E. Preston

April 4, 1933.   C. C. COLBERT ET AL   1,903,325
PAPER COATING METHOD AND APPARATUS
Filed Jan. 21, 1929    5 Sheets-Sheet 5

Inventors
Charles C. Colbert
George E. Preston
By Emery, Booth, Janney & Varney Attys.

Patented Apr. 4, 1933

1,903,325

UNITED STATES PATENT OFFICE

CHARLES C. COLBERT AND GEORGE E. PRESTON, OF ELKHART, INDIANA, ASSIGNORS TO AMERICAN COATING MILLS, OF ELKHART, INDIANA, A CORPORATION OF INDIANA

PAPER COATING METHOD AND APPARATUS

Application filed January 21, 1929. Serial No. 333,775.

This invention aims to advance the manufacture of coated paper and paper board by improving the coating process, particularly for the manufacture of paper board having a clay coated surface, and by providing practicable and efficient apparatus for carrying on the manufacturing operation.

The nature of the invention will be best understood by reference to an illustrative apparatus for practicing the invention and embodying the apparatus features thereof.

In the accompanying drawings.

Figure 1:
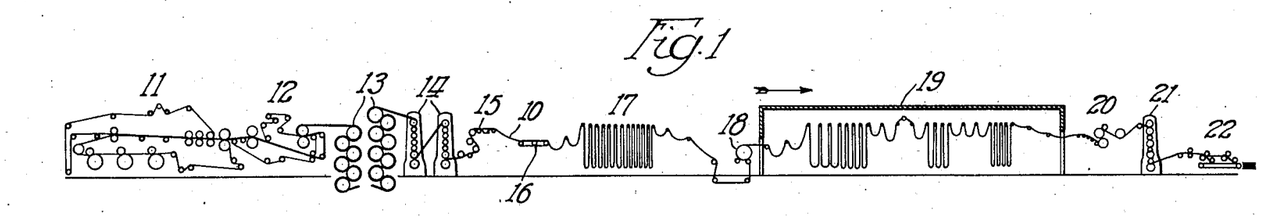
Fig. 1 is a diagrammatic representation indicating a a longitudinal sectional view of a plant comprising the illustrative apparatus.

The coating plant diagrammatically represented in Fig. 1 is used for the manufacture of coated paper board, and is of a general character such as disclosed in our United States Patent No. 1,514,439, of November 4, 1924, wherein the board is made from wet stock on a board-making machine and the continuous sheet of board delivered from said machine is passed through the successive operations for production of the finished coated product, without reeling the board between successive stages of manufacture.

In the drawings 10 denotes the continuous sheet of paper board, which is drawn from a source of supply represented in this instance by the board-making machine. The units of said illustrative plant of Fig. 1 may be briefly explained as follows:

The wet end or section of the board-making machine is indicated at 11, the press section thereof at 12, the dryers at 13, and the calenders at 14. The calendered board runs through a preliminary coating machine 15 and thence on a conveyor 16 into festoons or folds in a hang-up apparatus at 17. From the delivery end of the hang-up apparatus the board is drawn through a second coating machine 18, and thence runs into a drying room 19, in which the board is hung in festoons or folds for drying. From the delivery end of the drying room, the dry coated board is drawn past aligning, tensioning and smoothing means 20 to and through the super-calendering machine 21 for finishing the coated surface of the board. The super-calendered board may run through a cutting machine 22 which delivers the finished coated board in cut sheets.

Reference may be made to our aforesaid patent for an explanation of the construction and operation of the several units of the illustrative plant, excepting the preliminary coating machine 15 which is a novel element in said plant.

Said machine 15 is designed for applying to the surface of the board a preliminary light coat of the solution of material, such for instance as any of the ordinary clay solutions, with which the board is to be coated. In the ordinary commercial manufacture of coated paper or paper board, prior to the present invention, the coating has been applied in one operation by brushing or painting the surface of the board with the coating solution and subjecting the freshly coated surface to the action of reciprocating brushes for scrubbing or working the coating into the interstices of the paper and evenly on the surface, as well as to remove any excess. The second coating machine 18 embodied in the illustrative plant is of the general type usually employed for this regular or ordinary coating operation. We have found, however, particularly for the production of a clay coated product, that it is highly desirable to apply the coating in successive stages, first lightly coating the paper surface with the solution and drying the same, and then in the usual way applying and brushing a second coat of the solution on the pre-coated surface. Accordingly, in the illustrative plant the preceding machine 15 is employed, by which a preliminary light coat of coating solution is applied to the top calendered surface of the board by passing said surface in contact with a non-absorbent surface bearing a thin film of the solution. This preliminary coating is dried by exposure to the air of the plant house as the board hangs in festoons or folds in the hang-up apparatus 17, and from this apparatus the board is drawn through the second coating machine 18 which applies a second coat of such solution on the pre-coated surface and works the solution thereon by brushing in the regular way.

The specific machine employed as the preliminary coating machine in the illustrative plant is fully shown in Figs. 4 to 7. This machine embodies a solution trough 23 to which the coating solution is supplied through the pipe 24. Mounted above the solution trough is a revolving metal or steel surfaced roll 25, the under side of which is submerged in the solution. A felt covered roll 26 rotates in contact with said roll 25 and also in contact with a metal or steel surfaced coating roll 27. The felt covered roll 26 bears equally upon the steel rolls 25 and 27, and the pressure of contact may be regulated by means of the screws 28 for adjusting the bearings of said felt covered roll. The sheet of paper board is drawn in engagement with the steel coating roll 27, which rotates in a direction such that its surface in contact with the board travels contrary to the direction of the travel of the board, indicated by the arrow in Fig. 4. The arrangement is such that the surface of the board to be coated, which is the top calendered side of the board delivered from the calenders, is presented in contact with said steel coating roll 27. As shown, the board is drawn under a guide roll 30 at the front or receiving end of the machine, and around guide rolls 31 and 32. Between the rolls 30 and 31 are arranged cutter discs 33 coacting with discs 34 for trimming the edges of the board. A guiding or tensioning roller engaging the under side of the board behind the trimming discs is indicated at 35.

Figure 4:
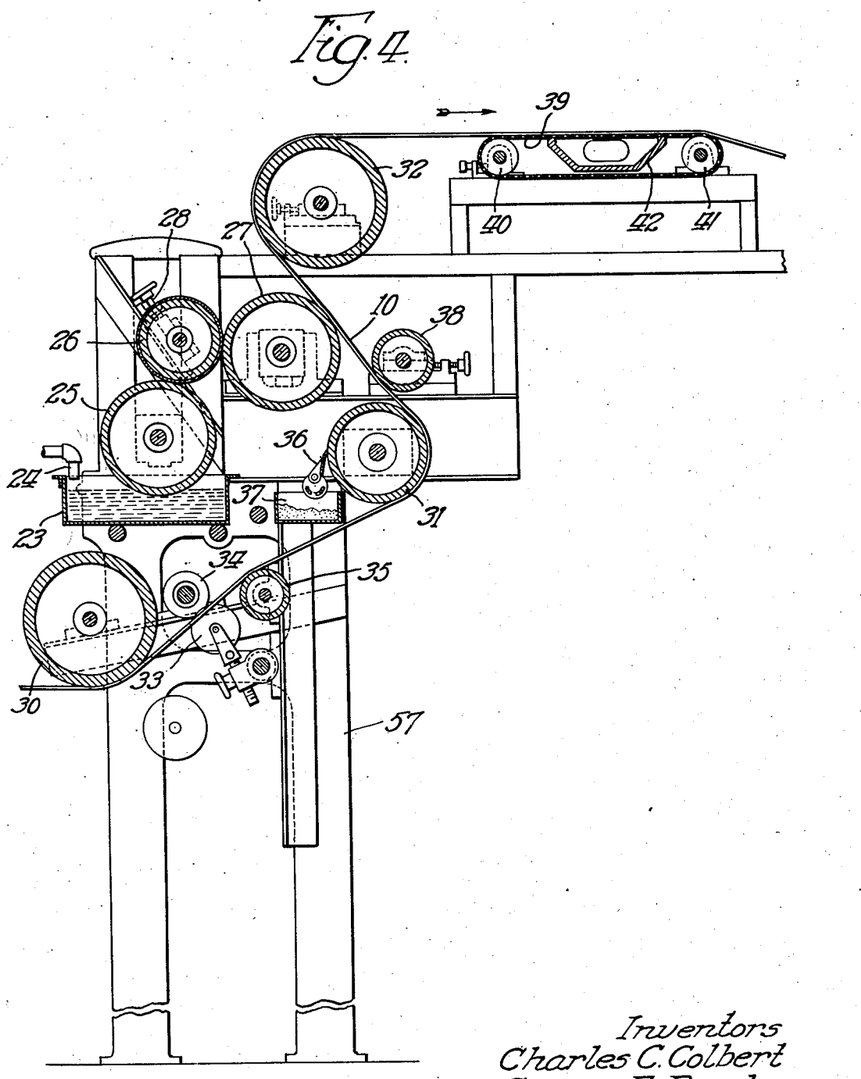
Fig. 4 is an enlarged longitudinal vertical section of a unit of the apparatus comprising a preliminary coating machine.

The lower and upper guide rolls 30 and 32 are preferably wooden rolls. The intermediate guide roll 31, which is engaged by the top surface of the board just before the board is drawn into engagement with the steel coating roll, is preferably a steel roll the surface of which is kept clean by a doctor or scraper blade 36. Any paper or filling material from the board which might adhere on said roll will be scraped off by the doctor into the trough 37. Thus a constantly clean roll surface is presented to the board running in contact therewith and to the coating roll. The board is shown running practically or nearly tangential to the steel coating roll 27, as only a brief contact is desired. However, the arc of contact between the board and the coating roll and the pressure of the board against said roll may be increased and varied, as may be required under different conditions, by means of the adjusting roll 38 engaging the back side of the board between the rolls 31 and 27.

Beyond the upper guide roll 32 the board is carried on a perforated rubber belt 39 passing around rollers 40 and 41. This belt, engaging the under side of the board, passes over the open top of a suction box or chamber 42, which box or chamber is sealed by the belt and board thereon, so that by virtue of the suction and consequent atmospheric pressure on the board over the suction box the board is locked to the rubber belt. Said belt travels in a direction to draw the board from the calendering machine through the preliminary coating machine and deliver it toward the hang-up apparatus.

Figure 5:
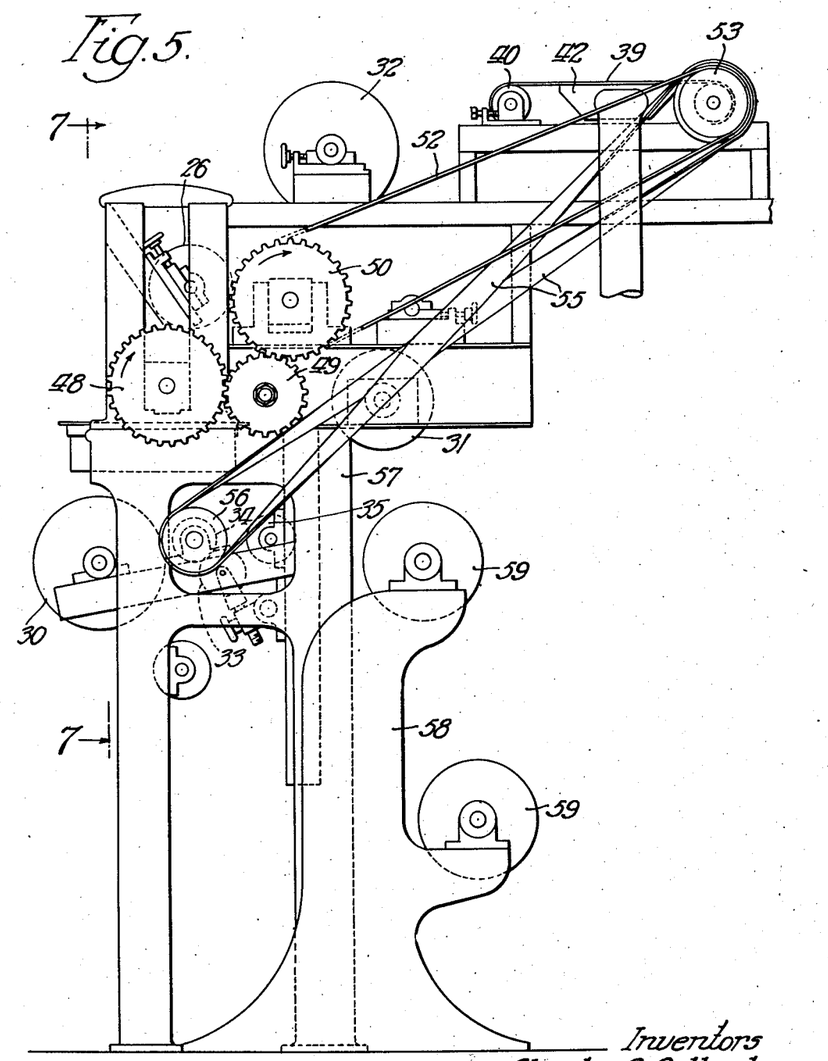
Fig. 5 is a side elevation of said preliminary coating machine.
Figure 6:
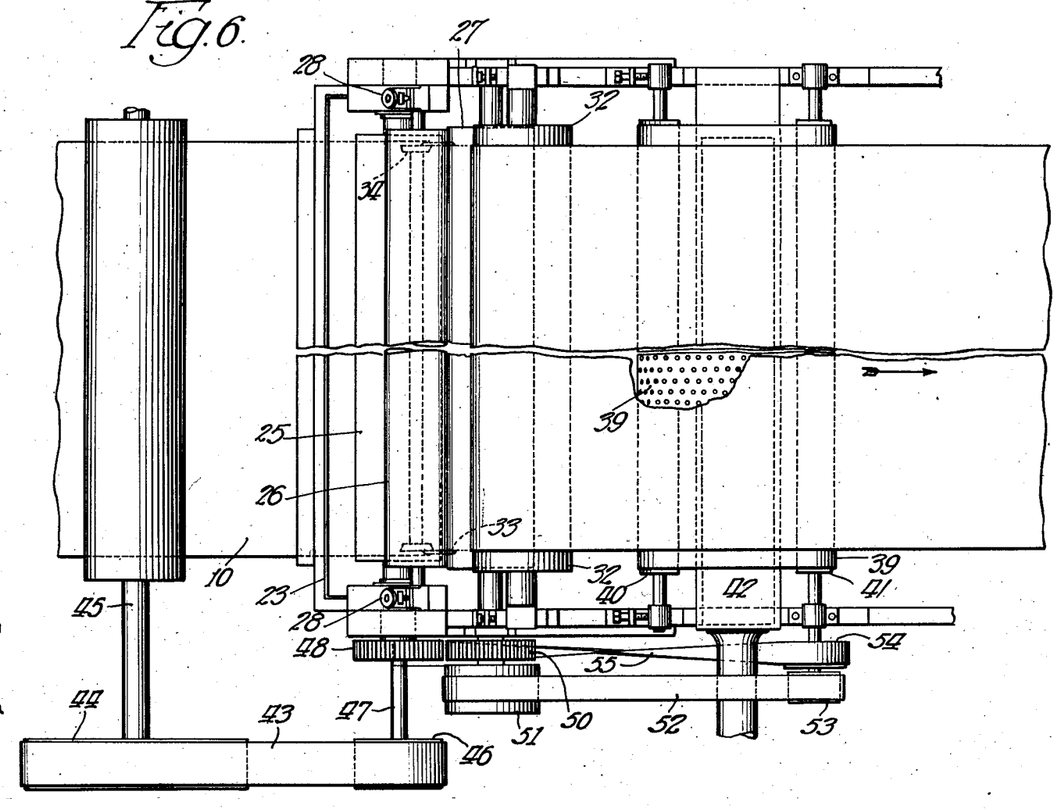
Fig. 6 is a top plan view thereof.
Figure 7:
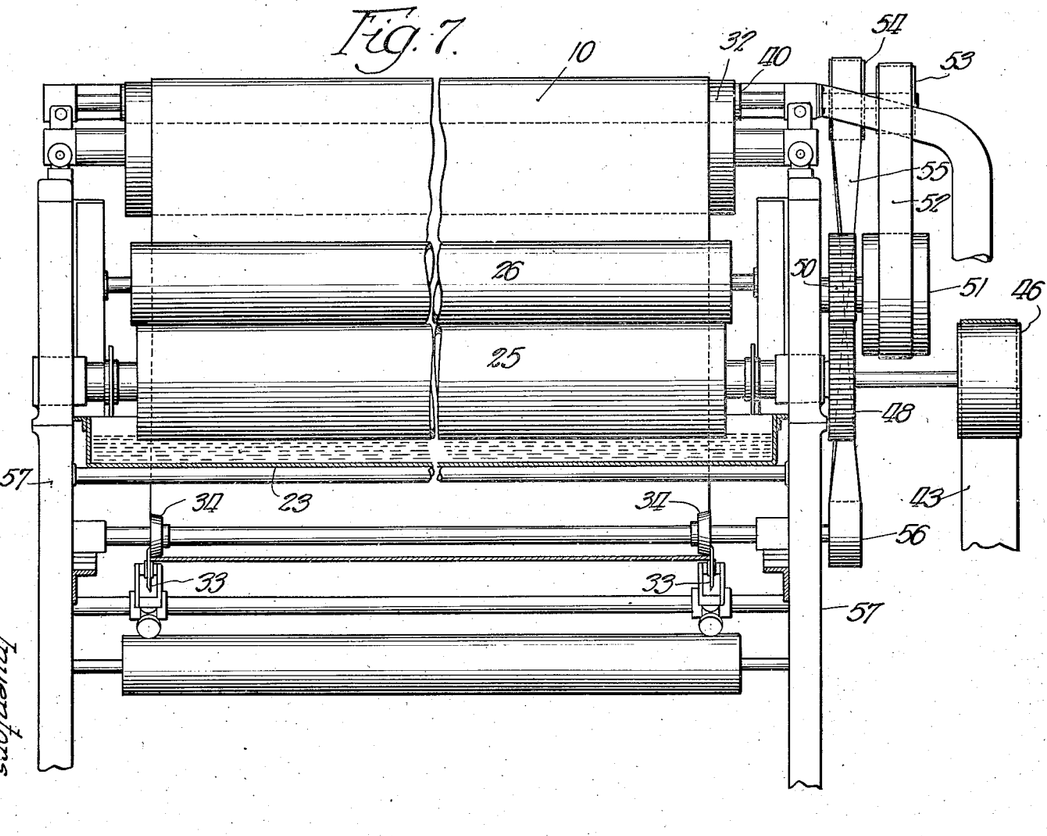
Fig. 7 is a front end elevation, partly in section on the line 7—7 of Fig. 5 looking in the direction of the arrow.

The rolls 25, 26 and 27 and the board feeding belt 39 may be driven by any suitable means, such as for example as shown in Figs. 5, 6 and 7. According to the arrangement shown in these figures, the roll 25 is driven from the calenders by means of a belt 43 engaging a pulley 44 on the shaft 45 of a calender roll, and engaging a pulley 46 on the shaft 47 of said roll 25. The coating roll 27 is driven from said shaft 47 by means of gear 48 meshing with an idler 49 which meshes with a gear 50 on the shaft of the coating roll 27. The felt covered roll 26 is driven by its frictional engagement with the contacting rolls 25 and 27. On the shaft of the roll 27 is a pulley 51 engaged by a belt 52 running around a pulley 53 on the shaft of the roller 41, whereby the rubber belt 39 for drawing the board through the machine is driven. On said shaft of the roller 41 is another pulley 54 engaged by a crossed belt 55 running around a pulley 56 on the shaft carrying the discs 34 coacting with the edge trimming discs 33.

Figures 2, 3:
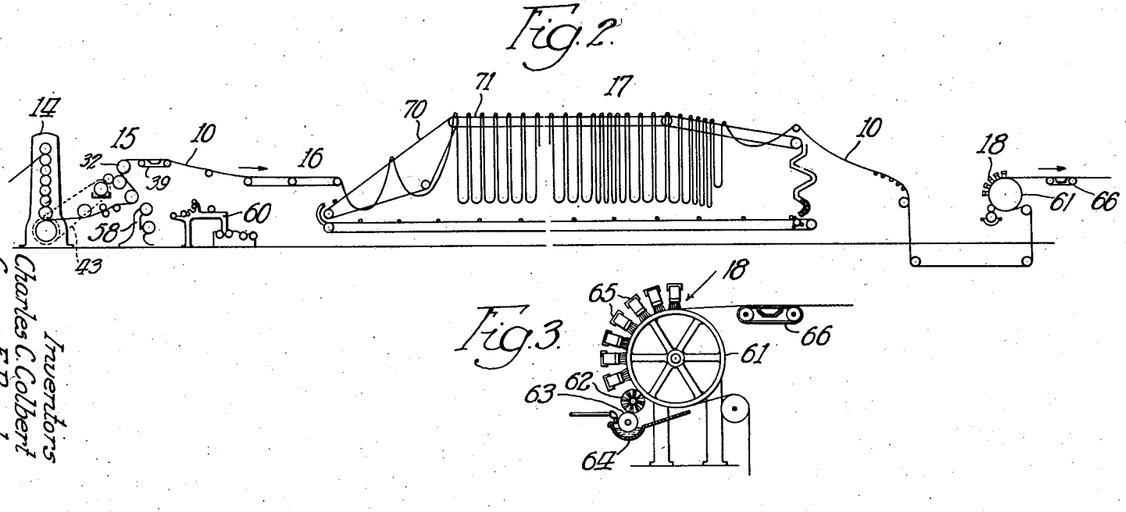
Fig. 2 is a diagrammatic representation on a larger scale of a section of the apparatus comprising or including the coating appliances.
Fig. 3 is a detail view on a slightly enlarged scale of a board coating machine or appliance employed in the illustrative plant.

The described elements of the preliminary coating machine are shown mounted in a suitable frame 57 which in this instance is shown straddling an ordinary reel stand 58 having reels 59 for use in reeling the board directly from the board-making machine if preferred. See Fig. 5. In Fig. 2 the reels are shown associated with an ordinary trimming and re-reeling machine 60. In other words, the particular plant shown for illustration is one in which the board being supplied on a board-making machine may be delivered directly to ordinary reeling and re-reeling mechanism or may be passed over the reels through the preliminary coating machine and to the subsequent appliances for conducting the manufacture of coated paper board.

In the operation of the preliminary coating machine, the felt covered roll 26 takes up coating liquid from the surface of the roll 25 and applies it as a thin film on the surface of the steel coating roll 27; and said roll 27 revolving against the paper surface to be coated rubs on the thin coating. In this way the preliminary coating is efficiently applied to the surface to be coated while the board is running at the rate of speed at which it is delivered from the board-making machine or at other comparable speeds at which the board may be drawn from a source of supply such as for instance a supply roll. The coating thus applied is considerably lighter than that ordinarily applied by a regular coating machine for ordinary coating operations; however, it is sufficient for a complete covering of the paper surface to be coated. The coating roll 27 may revolve at a surface speed somewhat faster than the speed at which the board is running, which insures a sufficient supply of the solution for the preliminary coating process. The amount of solution carried on the steel coating roll may also be somewhat varied by regulation of the pressure of the felt covered roll 26 on the rolls 25 and 27, while the amount of contact and pressure of the board on the coating roll may be varied, as required for the right degree of rubbing contact to insure the proper coating, by adjusting the roll 38.

As previously indicated, the light preliminary coat of solution is or may be dried by exposure to the air of the plant room as the board hangs in festoons or folds in the hang-up apparatus 17, such method of drying being ordinarily sufficient, and in the second coating machine 18 the board is subjected on its pre-coated surface to the regular or ordinary operation of applying coating solution and brushing or scrubbing the solution on the surface, after which the board is dried in the regular manner by hot air drying in the drying room. In this instance, the particular construction and arrangement of the second coating machine, and the lead of the paper board thereto, are as described in our aforesaid patent; the board being drawn from the hang-up apparatus past suitable guiding rolls under the floor of the plant to a point beyond the center of the second coating machine, and thence passing around the front of the breast-roll of said machine and off from the top thereof in a rearward direction toward the drying room, thus exposing on the breast-roll the proper side of the board to be coated, the side having the pre-coated surface. Said coating machine 18 is shown on a larger scale in Fig. 3, where 61 designates the breast-roll or revolving cylinder around which the board is drawn, 62 the rotating solution applying brush to which solution is supplied by the roll 63 revolving in the solution trough 64, and 65 designates the reciprocating brushes for working or scrubbing the solution on the board. At the delivery end of the machine is a perforated rubber conveyor belt 66 passing around suitable rollers and over a suction chamber, in the same manner as the belt 39 of the preliminary coating machine. Said belt 66 engaging the under side of the board and locked therewith by the suction, is suitably driven in a direction to draw the board to and through the second coating machine and to feed it rearwardly into the drying room.

The method of coating described has marked advantages contributing to improvement in the quality of the coated surface of the board, especially in the case of a clay coated product, and increased speed and economy in the manufacture of coated paper board on a large commercial scale. The light preliminary coat of solution furnishes a foundation which prevents absorption of the second coat of solution and makes the color stand out better, and renders it practicable to apply a lighter coat by the regular coating machine 18 than would ordinarily have to be applied by such machine in the case of coating the board in a single operation. In fact, the total amount of coating material used in the preliminary and second coating operations may be not greater than or may be even less than that used in the ordinary process of coating. Moreover, the coating may be effectively applied while running the sheet of board at faster speeds.

A solution of clay or clay and casein, with or without coloring pigments, and which may contain suitable percentages of sizing or other materials, may be understood as included in the term "clay solution."

Referring to the hang-up apparatus 17 interposed between the two coating appliances, as best seen in Fig. 2, this apparatus may be of a similar character to that preceding the coating machine in our aforesaid patent. It will be understood that the apparatus embodies a series of sticks which are circulated and successively elevated under the board so as to hang the same in festoons, and that these sticks carrying the hanging festoons of board are transferred from the elevating chains 70 to slowly moving conveyor chains 71, so that the hanging folds of board are slowly carried toward the delivery end of the apparatus and thus the board is stored in the apparatus exposed to the air of the plant room for a sufficient time for drying the light preliminary coat. This hang-up apparatus may embody means such as shown and described in our aforesaid patent, whereby a number of the sticks carrying the folds of board may be crowded into close assembly in the delivery end of the apparatus so as to provide a flexible surplus accumulation or supply to suit conditions in the operation of the plant, such for instance as interruptions in the supply of the board or in the operation of either of the coating appliances. For example, in the illustrated plant where the board is continuously made on a board-making machine, the board runs continuously from said machine and through the first coating appliance 15, which first coating appliance is designed for application of the preliminary coating on the continuously running board, while on the other hand the operation of the second or regular coating machine 18 must be occasionally interrupted for changing colors, cleaning brushes, or the like. In the case of such occasional interruption of the second coating operation, the board may run continuously into the flexible supply in the interposed hang-up apparatus 17, and upon resumption of operation of the coating machine 18, the surplus may, if desired, be drawn off by speeding up the second coating machine. Again, in the event of any occasional necessary interruption of the operation of the first coating machine 15 or in the supply of the board, as for instance when drawing the supply from rolls and changing from one roll to another, the second coating machine may continue to draw the board from the flexible accumulation in the hang-up apparatus. The interposition between the two coating appliances of means for maintaining a flexible accumulation of the slack board is thus of great practical advantage.

The hang-up apparatus in the drying room may be of similar general character to that described in the aforesaid patent and embody a similar means for maintenance of a flexible accumulation of the hanging folds of the dried board in the delivery end of the drying room so as to suit varying conditions caused by occasional interruptions in the operation either of the coating machine 18 or of the super-calendering machine 21.

Paper board or other sheet of paper material suitable for coating by the present invention is embraced under the term "paper" in the following claims.

What we claim as our invention, and desire to secure by Letters Patent, is:

1. The improvement in coating paper characterized by applying to the surface of the paper a preliminary light coat of clay solution, air drying the same, at room temperature while hanging up the sheet in folds, withdrawing the sheet from said folds and applying and brushing similar clay solution on the preliminary coated surface, and then drying the paper by heated air.

2. The improvement in coating paper characterized by applying to the surface of the paper a light coat of clay solution, drying the same, then applying said surface and brushing thereon a second light coat of such solution of the same color, and then drying the paper.

3. The improvement in coating paper characterized by preliminarily lightly coating a surface of the paper by brief contact of said paper surface with a non-absorbent surface bearing a thin film of clay coating solution, exposing the paper to air sufficiently for drying of said surface, then coating the paper on its pre-coated side by applying and brushing similar coating solution of the same color thereon, and then drying the paper.

4. The improvement in coating paper characterized by applying thereto a light coat of clay coating solution by brief contact of the surface of the paper with a non-absorbent surface bearing a thin film of such solution, drying the same, applying and brushing a second light coat of such solution of the same color on the pre-coated surface of the paper, and then drying the paper.

5. In an apparatus of the class described, means for applying a preliminary light coat of coating solution to the paper sheet, said means embodying a non-absorbent surface bearing a film of such solution operating in brief contact with the sheet; and succeeding means for applying and brushing coating solution on the pre-coated surface of the sheet.

6. In an apparatus of the class described, a preliminary coating appliance embodying a roll having a non-absorbent surface, in contact with which the paper sheet is drawn, and means continuously supplying the surface of said roll with a thin film of coating solution for transference to the contacting paper sheet; and a succeeding coating appliance arranged for operating on the pre-coated side of the sheet and embodying means for applying coating solution thereto and brushes for brushing the same on said surface.

7. A paper coating appliance having, in combination, means for drawing the sheet from a supply source; guide rolls around which the sheet is drawn so as to run from a side of one guide roll to the opposite side of another guide roll, a metal surfaced roll arranged to engage the sheet between said guide rolls and revolving in contact with the sheet in opposition to the travel of the sheet; a trough for coating solution; a revolving metal surfaced roll dipping in the solution; and a felt surfaced roll revolving in contact with said metal surfaced rolls, for transfer of the solution from the surface of the roll dipping in said trough to the surface of the roll contacting with the paper sheet.

8. An apparatus of the class described having, in combination, means for drawing the sheet from a supply source, means for applying a preliminary light coat of coating solution on a surface of the running sheet, said preliminary coating means comprising a revolving roll having a non-absorbent surface against which the sheet is drawn and means for supplying a thin film of said solution to said surface, hang-up apparatus into which the preliminarily coated sheet is delivered and in which a quantity is exposed to air for drying its preliminarily coated surface sufficiently for application of a second coat of coating solution to said surface, and means for applying said second coat embodying a breast roll around which the sheet is drawn with its said preliminarily coated surfaces exposed thereon, said last named means comprising a rotating solution-applying brush and reciprocating brushes arranged for brushing the applied solution into the surface of the sheet.

9. An apparatus of the class described having, in combination, a revolving roll having a non-absorbent surface in contact with which the sheet is drawn in opposition to the direction of travel of the roll, means for continuously maintaining a thin film of coating solution on said roll, hang-up apparatus into which the sheet is delivered and in which a quantity thereof is exposed to air for drying the preliminarily coated surface sufficiently for application thereto of a second coat of coating solution, and means through which the sheet is drawn for applying and brushing said second coat on the said surface.

10. The improvement in the manufacture of a coated sheet of paper material characterized by running the sheet into a flexible accumulation, while preliminarily coating the sheet with a light coat of clay solution as it runs to said accumulation, exposing the sheet in said accumulation sufficiently for drying its preliminary coated surface, and withdrawing the sheet from said accumulation while coating the same on its pre-coated surface with a second coat of similar solution of the same color, the said surface being maintained free from contact with any other surface between the first and second coating operations.

11. The improvement in the art of coating paper characterized by drawing the sheet against a roll bearing a thin film of coating solution, while rotating the roll contrary to the direction of travel of the sheet, storing the preliminarily coated sheet in hanging folds until its preliminarily coated surface is sufficiently dry to receive a second coat of such solution, and drawing off the sheet while applying and brushing such second coat on the said preliminarily coated surface.

12. A paper coating appliance having, in combination, guide rolls around which the paper sheet is drawn so as to run from a side of one guide roll to the opposite side of another roll, a revolving roll having a non-absorbent surface engaging the sheet between said guide rolls and revolving in opposition to the direction of travel of the sheet, and means for continuously supplying on said last mentioned roll a thin film of coating solution.

In testimony whereof, we have signed our names to this specification.

CHARLES C. COLBERT.
GEORGE E. PRESTON.

CERTIFICATE OF CORRECTION.

Patent No. 1,903,325. April 4, 1933.

CHARLES C. COLBERT, ET AL.

It is hereby certified that error appears in the printed specification of the above numbered patent requiring correction as follows: Page 4, line 62, claim 2, before "said" insert the word "to"; and that the said Letters Patent should be read with this correction therein that the same may conform to the record of the case in the Patent Office.

Signed and sealed this 23rd day of May, A. D. 1933.

(Seal)

M. J. Moore.
Acting Commissioner of Patents.